US010539697B2

(12) United States Patent
Toennessen et al.

(10) Patent No.: US 10,539,697 B2
(45) Date of Patent: Jan. 21, 2020

(54) SOURCE TOWING ARRANGEMENT (71) Applicant: PGS Geophysical AS, Oslo (NO)

(72) Inventors: Rune Toennessen, Oslo (NO); Mattias Oscarsson, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/617,609

(22) Filed: Jun. 8, 2017

(65) Prior Publication Data
US 2017/0371056 A1 Dec. 28, 2017

Related U.S. Application Data (60) Provisional application No. 62/354,387, filed on Jun. 24, 2016.

(51) Int. Cl.
*G01V 1/38* (2006.01)
*B63B 21/66* (2006.01)
*G01V 3/15* (2006.01)

(52) U.S. Cl.
CPC .......... *G01V 1/3817* (2013.01); *B63B 21/66* (2013.01); *G01V 1/3808* (2013.01); *G01V 3/15* (2013.01); *B63B 2211/02* (2013.01); *B63B 2708/00* (2013.01)

(58) Field of Classification Search
CPC . B63B 21/66; B63B 2211/02; B63B 2708/00; G01V 1/3861; G01V 1/3817; G01V 3/15; G01V 1/3808
USPC .......................................................... 367/18
See application file for complete search history.

(56) References Cited

U.S. PATENT DOCUMENTS

| 4,831,599 | A | 5/1989 | Dragsund et al. |
| 7,223,137 | B1 * | 5/2007 | Sosnowski ............. B63B 35/44 290/54 |
| 7,738,317 | B2 | 6/2010 | Toennessen |
| 9,234,978 | B2 | 1/2016 | Frivik et al. |
| 2004/0000446 | A1 | 1/2004 | Barber |
| 2006/0176774 | A1 | 8/2006 | Toennessen |
| 2006/0227658 | A1 | 10/2006 | Toennessen |
| 2007/0051294 | A1 * | 3/2007 | Pike ........................ B63B 23/00 114/348 |
| 2008/0304357 | A1 | 12/2008 | Toennessen |
| 2014/0112096 | A1 | 4/2014 | Dowle et al. |
| 2014/0269173 | A1 | 9/2014 | Coste et al. |
| 2016/0187517 | A1 | 6/2016 | Brenders et al. |
| 2016/0259072 | A1 | 9/2016 | Richer et al. |

FOREIGN PATENT DOCUMENTS

WO          2012041844          4/2012

OTHER PUBLICATIONS

International Search Report & Written Opinion for related PCT Application PCT/EP2017/065567, dated Aug. 2, 2017 (13 pgs).

* cited by examiner

*Primary Examiner* — Daniel L Murphy (57) ABSTRACT

A system can include a source and a front float coupled to the source. The front float can include a winch configured to adjust a position of the source. The front float can include a control unit configured to control functions associated with the front float. Lead-ins can be coupled to the front float and the source and configured to accommodate transfer of electrical energy between the front float and the source.

22 Claims, 8 Drawing Sheets

SOURCE TOWING ARRANGEMENT

CROSS-REFERENCE TO RELATED APPLICATIONS

This application claims priority to U.S. Provisional Application 62/354,387, filed Jun. 24, 2016, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the surface of the water and over a subterranean formation to be surveyed for mineral deposits. Receivers may be located on or near the seafloor, on one or more streamers towed by the marine survey vessel, or on one or more streamers towed by another vessel.

The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wavefield that travels down through the water and into the subterranean formation. At each interface between different types of rock, a portion of the wavefield may be refracted, and another portion may be reflected, which may include some scattering, back toward the body of water to propagate toward the surface of the water. The receivers thereby measure a wavefield that was initiated by the actuation of the source. The receivers, sources, or additional survey equipment can be pulled through the water using lines such as cables, ropes, strings, cords, wires, etc. The lines can cause drag on the equipment as the lines are pulled through the water, thereby reducing efficiency of the system.

DETAILED DESCRIPTION

The present disclosure is related generally to the field of marine surveying. Marine surveying can include, for example, seismic or electromagnetic surveying, among others. For example, this disclosure may have applications in marine surveying, in which one or more sources are used to generate wavefields, and receivers—either towed or ocean bottom—receive energy generated by the sources and affected by the interaction with the subsurface formation. In particular, the present disclosure is related to front floats for distributing sources cross-line and in-depth. A float is an object having a buoyancy such that it remains at or near the surface of water. An example of a float is a buoy. A front float is a float positioned at a "front" of a spread, meaning front floats are closer to streamers in a marine survey system as compared to other floats in the marine survey system. The term "front float" is not limiting in that embodiments can include other floats positioned forward of the front float in the inline direction.

Distributing cross-line refers to the lateral positioning of a source, and in-depth refers to the depth of a source. For instance, distributing a source cross-line can include distributing sources cross-wise along a front end of a spread substantially orthogonal to the motion of the vessel, for instance in a manner similar to the streamers. Distributing a source in-depth can include distributing the source in a substantially orthogonal manner with respect to a seafloor and a sea surface. Substantially orthogonal can comprise, for example, a little more than orthogonal or a little less than orthogonal, but within a threshold. For example, a substantially orthogonal direction can comprise a direction that is closer to orthogonal than parallel. Similarly, substantially parallel can comprise a little more than parallel or a little less than parallel, but within a threshold. For example, a substantially parallel direction can comprise a direction that is closer to parallel than orthogonal.

A source is a device that releases energy into the earth in the form of waves and may be impulsive or non-impulsive. Non-impulsive sources differ from impulsive sources in that they transmit energy for an extended period of time, as compared to impulsive sources which transmit energy for a short period of time. For instance, non-impulsive sources can transmit energy near-continuously or continuously, while impulsive sources can transmit energy in a short period of time. As used herein, "near-continuous" can include without meaningful breaks. As would be understood by one of ordinary skill in the art with the benefit of this disclosure, operational circumstances can cause intermittent gaps (due to equipment failure, etc.), and "near-continuous" should be read to include transmission with intermittent or periodic gaps, whether planned or unplanned as well as without intermittent or periodic gaps, thus including "continuous transmission." For simplicity, the term "near-continuous" and "near-continuously" will be used herein and do not exclude "continuous" or "continuously". Examples of non-impulsive sources include vibrators, while examples of impulsive sources include air guns.

A towed object, such as a source, a receiver, or a streamer, may be towed behind a marine survey vessel. A streamer is a marine cable assembly that can include receivers and electrical or optical connections to transmit information collected by the receivers to the marine survey vessel. The streamer can include receivers such seismic receivers (e.g., hydrophones, geophones, etc.) or electromagnetic receivers. The receivers may be arranged in a "spread". A spread is the geometrical pattern of groups of receivers relative to a source. The output from a single actuation of a source can be recorded simultaneously by the spread during seismic acquisition.

Marine surveys employing towed objects may involve the use of a front float to provide buoyancy or steering control for the towed object. The towed object can be at least partially supported by the buoyancy of the front float holding the towed object a particular distance from the surface of the water via a line or cable between the towed object and the float. As used herein, a line is a cylindrical flexible strand (or strands such as braided strands) of material that can be used in a marine environment. Examples of lines include ropes, strings, cords, wires, etc. Lines can stand alone or can be located in cables. As used herein, a cable is a cylindrical flexible strand (or strands such as braided strands) of material that can be used in a marine environment and contains lines (e.g., communication lines, power lines, etc.). Examples of cables include tether cables, umbilicals, etc. Lines and cables can be made of metal, alloy, or any long, stringy, fibrous material including natural or synthetic fibers such as hemp, polypropylene, nylon, polyesters, aramids, and acrylics.

In some marine survey systems, no components are housed on front floats or components housed on front floats are limited to winches. These front floats primarily float on the surface of the water to give buoyancy to streamers, cables, and lines and to keep streamers at a desired depth, but may not be coupled to sources and may not receive electrical energy. For instance, a marine survey vessel may be coupled to streamers via lines, and the streamers are held by spread ropes and cable hangers. A line or cable can couple the streamer to a front float, but the line or cable may not accommodate the transfer of electrical energy. As a result, components of these front floats may not be powered.

In contrast, at least one embodiment of the present disclosure includes a source towing arrangement including a front float that can house a plurality of components and can be coupled to both streamers and sources. The front float can receive electrical energy via a cable housing power and communication lines, and at least one of the plurality of components can use this electrical energy to power the component. Additionally or alternatively, the sources coupled to front float can use this electrical energy. Further, at least one embodiment of the present disclosure can include a front float housing an alternative energy source, such that the front float can produce its own power (e.g., via a battery, solar panel, turbine, etc.).

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The term "or" should be read to mean "inclusive or" (e.g., "and/or") unless the context clearly indicates that the term "or" means "exclusive or."

The figures herein follow a numbering convention in which the first digit or digits correspond to the drawing figure number and the remaining digits identify an element or component in the drawing. Similar elements or components between different figures may be identified by the use of similar digits. For example, 206 may reference element "06" in FIG. 2, and a similar element may be referenced as 306 in FIG. 3. Multiple analogous elements within one figure may be referenced with a reference numeral followed by a hyphen and another numeral or a letter. For example, 124-1 may reference element 24-1 in FIGS. 1 and 124-2 may reference element 24-2, which can be analogous to element 24-1. Such analogous elements may be generally referenced without the hyphen and extra numeral or letter. For example, elements 124-1 and 124-2 may be generally referenced as 124.

As will be appreciated, elements shown herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
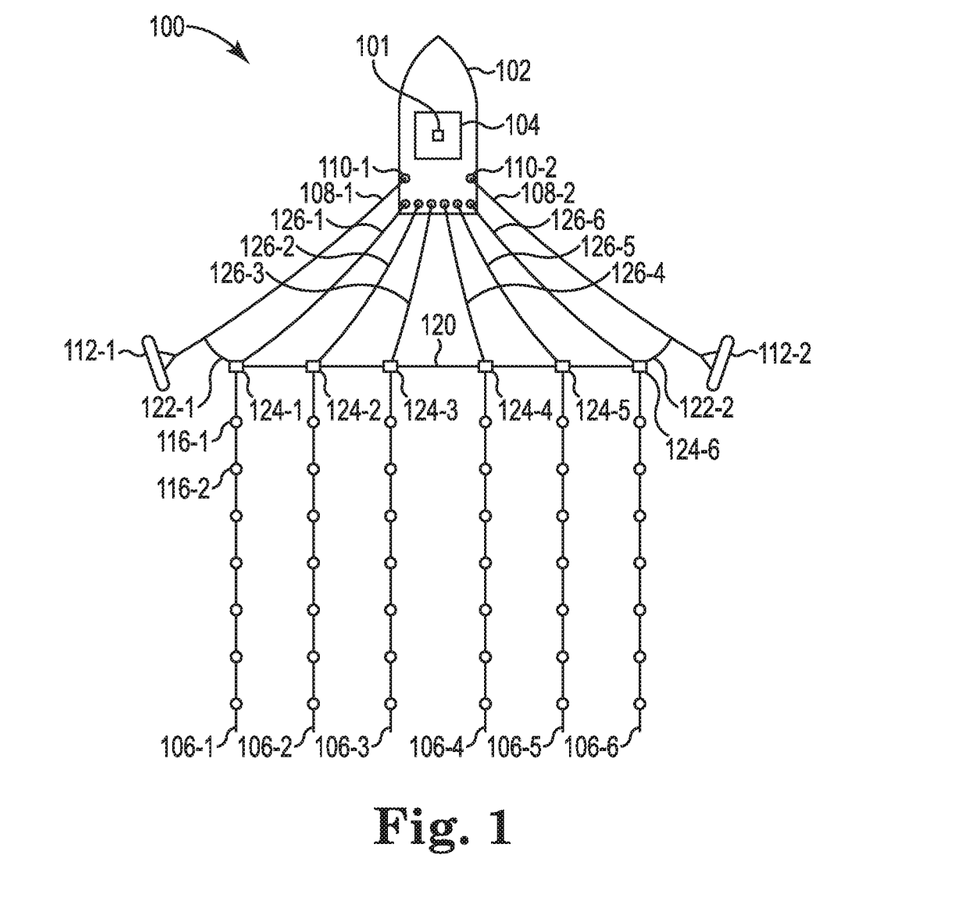
FIG. 1 illustrates an overhead view of a marine survey system.

FIG. 1 illustrates an overhead view of a marine survey system 100. FIG. 1 illustrates a marine survey vessel 102 having onboard equipment 104, such as navigation, source control, and data recording equipment. The onboard equipment 104 can include a control unit 101 for controlling functions of components of the system 100, although in at least one embodiment, some components, such as front floats, can have their own electronic control units located on the component itself. For embodiments in which the control unit 101 is on the onboard equipment 104 or on both the onboard equipment 104 and on the system component, control can be provided between the marine survey vessel 102 and the system component in a wired or wireless fashion. For example, a control unit on a front float can receive control signals from the marine survey vessel 102 via wired or wireless transmission.

The marine survey vessel 102 is configured to tow one or more towed objects. Towed objects are generally illustrated herein as streamers, however embodiments are not so limited, as the towed objects can be sources, receivers, or other objects towed by the marine survey vessel 102. The marine survey vessel 102 can be configured to tow towed objects 106-1, 106-2, 106-3, 106-4, 106-5, 106-6, through water. While FIG. 1 shows six towed objects 106, embodiments are not so limited and any number of towed objects may be used. The towed objects 106 can be coupled to towing equipment that maintains the towed objects 106 at selected depth and lateral positions with respect to each other and with respect to the marine survey vessel 102. For example, the towing equipment can comprise a first paravane tow line 108-1 coupled to the marine survey vessel 102 by way of a first onboard winch 110-1 and a second paravane tow line 108-2 coupled to the marine survey vessel 102 by way of a second onboard winch 110-2. The onboard winches 110 enable changing the deployed length of each paravane tow line 108. The second end of a first paravane tow line 108-1 can be coupled to a first paravane 112-1, and the second end of a second paravane tow line 108-2 can be coupled to second paravane 112-2. In each case, the tow lines 108 can be coupled to their respective paravanes 112 through respective set of lines called a "bridle." The paravanes 112 are each configured to provide a lateral force component to the various components of the marine survey system when the paravanes 112 are towed in the water. The combined lateral forces of the paravanes 112 separate the paravanes 112 from each other constrained by one or more spreader lines 120 coupled between the paravanes 112. The paravanes 112 can be coupled directly to the spreader line 120, or as illustrated, coupled to the spreader line 120 by way of a first spur line 122-1 and a second spur line 122-2. As used herein, a paravane can be provided on the side of a marine survey system to maintain a transverse distance (relative to the path of the marine survey vessel) between streamers. The paravane can be connected to the marine survey vessel via lines or cables, and a same or different type of lines or cables can be used to separate the streamers from one another. In at least one embodiment, marine survey system 100 does not include paravanes 112.

The towed objects 106 can each be coupled, at the ends nearest the marine survey vessel 102 (i.e., the proximal ends) to a respective lead-in termination 124-1, 124-2, 124-3, 124-4, 124-5, 124-6. The lead-in terminations 124 can be coupled to or are associated with the spreader lines 120 so as to control the lateral positions of the towed objects 106 with respect to each other and with respect to the marine survey vessel 102. Electrical or optical connections between the appropriate components in the onboard equipment 104 and the receivers, such as receivers 116-1 and 116-2, in the towed objects 106 may be made using lead-ins 126-1, 126-2, 126-3, 126-4, 126-5, 126-6. Much like the tow lines 108 associated with respective onboard winches 110, each of the lead-ins 126 may be deployed by a respective onboard winch such that the deployed length of each lead-in 126 can be changed. As used herein, a lead-in can be a cable or line that connects a streamer to a marine survey vessel. Although not illustrated in FIG. 1 due to perspective, each towed object 106 can be coupled to one or more front floats, and those one or more front floats can be coupled to one or more sources, as described in more detail herein. As used herein, a front float can use power for a source coupled to the float, for a control and communication unit, winch, bay door, global positioning system (GPS), acoustic pinger, router, an alternative energy source, navigation lights, or a compressor, among others.

Figure 2:
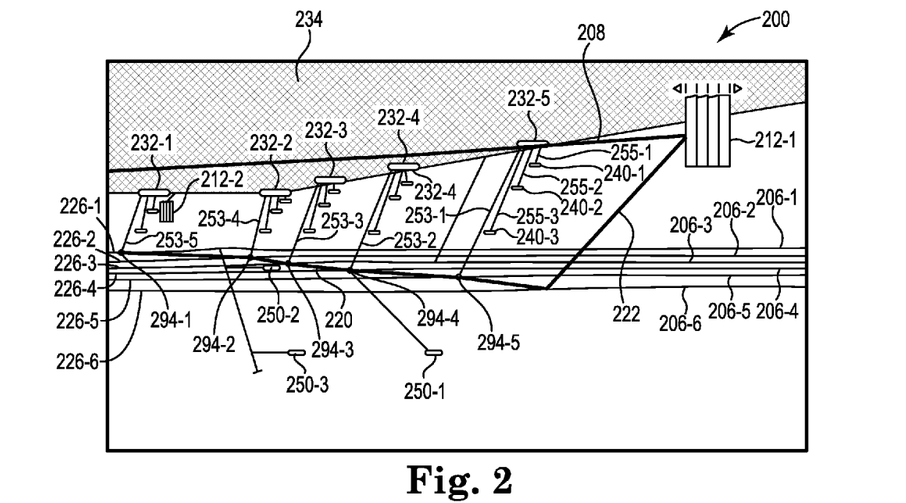
FIG. 2 illustrates a bottom view of a marine survey system.

FIG. 2 illustrates a submerged view of a marine survey system 200 traveling on sea surface 234. The marine survey system 200 can be analogous to the marine survey system 100 illustrated in FIG. 1 and can include a spread, which can include streamers and lines, among other system and towed components. The marine survey system 200 can include paravanes, also known as deflectors, 212-1 and 212-2 coupled to streamers 206-1, 206-2, 206-3, 206-4, 206-5, and 206-6 to spread streamers 206. More or fewer paravanes and streamers may be present in marine survey system 200 and can be arranged differently than illustrated in FIG. 2. Marine survey system 200, in at least one embodiment can include a spreader line 220, a spur line 222, and a paravane tow line 208. For instance, these lines can connect the spread.

Streamers 206 can be connected to lead-ins 226 at connection points 294. For instance, streamers 206 are illustrated to the right of connection points 294, while lead-ins 226 are illustrated to the left of connection points 294. Put another way, lead-ins 226 are connected to a marine survey vessel, and floats 232 are coupled to the lead-ins 226 via cables 253 housing at least power and communication lines. Streamers 206 are also connected to lead-ins 226. As used herein, a connection point can be point of connection between a lead-in and the streamers.

Cables 253-1, 253-2, 253-3, 253-4, 253-4, and 253-5 can be extended from front floats 232-1, 232-2, 232-3, 232-4, and 232-5 to lead-ins 226. Cables 253 can house communication lines, power lines, or both. In at least one embodiment, cables 253 can house other lines, such as lines carrying air or gas. Power lines can accommodate transfer of electrical energy (e.g., power) between the each streamer 206 and each front float 232, while communications lines can accommodate transfer of digital, optical, or both digital and optical communications. More or fewer lines and front floats may be present in marine survey system 200 and can be arranged differently than illustrated in FIG. 2. For instance, while not illustrated, more than six streamers may be present in marine survey system 200. In the example illustrated in FIG. 2, a source carrying front float 232 can be located on every second streamer 206, every third streamer 206, or other regular or irregular intervals.

Lines 255 can be extended from front floats 232 to sources 240 in at least one embodiment. For example, lines 255-1, 255-2, and 255-3 can be extended from front floats 232 to sources 240-1, 240-2, and 240-3, respectively. While not numbered in FIG. 2, similar lines to those coupled to front float 232-5 and sources 240-1, 240-2, and 240-3 can be coupled to front floats 232-1, . . . , 232-4 and their associated sources. In at least one embodiment, at least a portion of the sources 240 is connected to lead-ins 226 via cables. The cables can house power lines, communication lines, air/gas hoses, or a combination of these. This can allow for spreading sources 240 cross-line and in-depth. For instance, cross-line spreading can be along spreader line 220. In at least one embodiment, front floats 232 can be distributed along spreader line 220, resulting in sources 240 being distributed cross-line. Front floats 232 can give buoyancy to lines, streamers, and sources 240 coupled to the front floats 232.

Lines 255 can include power lines that accommodate transfer of electrical energy between each source 240 and each front float 232. More or fewer lines and sources 240 may be present in marine survey system 200 and can be arranged differently than illustrated in FIG. 2. Lines 255 can supply power to components located in, on, and coupled to front floats 232.

Winches (not illustrated in FIG. 2) can also be present to adjust positioning of streamers 206 and sources 240. For instance, front floats 232 can have one or more onboard winches to extend lines between the front floats 232 and the lead-ins 226 and between the front floats 232 and the sources 240. The lines, including lines 255, can be extended outward from and retracted inward toward the front float 232 by way of a winch coupled to the front float 232. In at least one embodiment, the winch can be housed within the front float 232. In at least one embodiment, the winch can be coupled to the front float 232 externally to the front float 232. The winch can turn a particular direction to extend the lines and turn a different direction than the particular direction to retract the lines. For example, the winch can rotate clockwise to extend the lines and rotate counterclockwise to retract the lines, or vice versa. The winch can be motorized such that power is applied to turn the winch. The winch can include a reel or pulley over which the lines can be spooled. As the lines are retracted, the streamers 206 and sources 240 can be pulled closer to the front float 232 and therefore closer to the surface of the water. As the lines is extended, the streamers 206 and sources 240 can be lowered further from the front float 232 and therefore deeper into the water and further from the surface of the water. The lines can be of any length. The winch is not limited to the winding spool described herein and can include other devices that can extend and retract line lines.

The marine survey system 200 can also include sources 250-1 and 250-2, and 250-3. Source 250-3, in at least one embodiment, can be a source sled. More or fewer sources than shown in FIG. 2 may be present in marine survey system 200. Sources 250, in at least one embodiment, are associated with marine survey system 200, and can include different frequency sources. For instance, the source 250-3 can be a low-frequency source sled, while the source 250-1 can be a medium-frequency source. The low-frequency source sled 250-3 can be towed in the middle of the spread and deeper than higher frequency source elements. The medium-frequency source 250-1 can be towed below a point where a front float is connected to a lead-in. While one low-frequency and one medium-frequency source are illustrated in FIG. 2, in at least one embodiment, more or less of either type may be present in marine survey system 200. For instance, a different low-frequency source can be towed wider laterally in the spread. In at least one embodiment, sources 250 can be coupled to lead-ins 226 via lines. Sources 250, in at least one embodiment, can be coupled to a marine survey vessel via a line or cable including, for instance, a lead-in 226, an umbilical, or a passive tow member.

Figure 3:
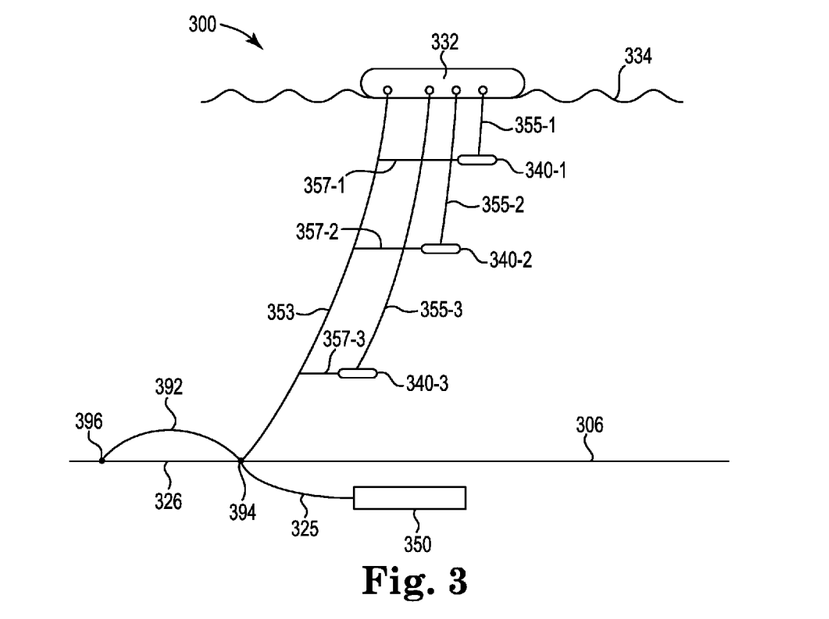
FIG. 3 illustrates a side view of a marine survey system including a front float.

FIG. 3 illustrates a side view of a marine survey system 300 traveling on sea surface 334 and including a front float 332. The marine survey system 300 can be analogous to the marine survey system 100 illustrated in FIG. 1. The marine survey system 300 can include a streamer 306. While one streamer is illustrated in FIG. 3, more streamers may be present in marine survey system 300. The front float 332 can be coupled to a cable 353, which is connected to lead-in 326. The streamer 306 can also be coupled to lead-in 326. The cable 353, in at least one embodiment can be a cable housing power and communication lines, with the power lines supplying the front float 332 with electrical energy (e.g., power) and the communication lines being used for communication purposes. The front float 332 and the streamer 306 can be connected to a same point or points in close proximity to one another on the lead-in 326. In at least one embodiment, the line 353 can transfer electrical energy and communication from the marine survey vessel, via lead-in 326 to the front float 332. The lead-in 326 can power and accommodate communication with the streamer 306 independently from front float 332. In at least one embodiment, the line 353 can be configured to transfer a fluid, such as air, between the front float 332 and the connection point 394. The aforementioned communication line and line 353, in at least one embodiment, can transport a fluid, such as air, from the marine survey vessel to the front float 332 when the fluid is not supplied from a source, such as an independent compressor, located on the front float 332. Sources 340-1, 340-2, and 340-3 are coupled to the front float 332 via lines 355-1, 355-2, and 355-3, respectively. In at least one embodiment, sources 340 are band-limited sources, including, for instance, bender sources. As used herein, a bender source is a flexural disc projector. A bender source may employ one or more piezoelectric elements, such that the mechanical vibration of the bender source is driven by piezoelectric distortion based on electrical energy applied to the piezoelectric element. In at least one embodiment, source 340-1 has the highest frequency of sources 340, source 340-3 has the lowest frequency of sources 340, and source 340-2 has a frequency between sources 340-1 and 340-3. For example, in at least one embodiment, marine survey system 300 includes a narrow banded high-high frequency source 340-1, a narrow banded mid-high frequency source 340-2, and a narrow banded lower-high frequency source 340-3. Sources 340 when taken together can be a high frequency source in at least one embodiment and are suspended beneath the front float 332, and above the streamer 306.

Lines 355, in at least one embodiment, can be power lines or communication lines, which can accommodate transfer of electrical energy or communication between front float 332 and sources 340. In at least one embodiment, line 355 can be an umbilical providing fluid supply for source internal pressure compensation to compensate for water pressure. As used herein, an umbilical can include a cable or line supplying a fluid such as air, gas, or other consumables. In at least one embodiment, lines 355 can compensate for ambient water pressure using air carried in lines 355. The air can be generated on the front float 332 by an electric compressor on the float 332, for example. Sources 340 can be coupled to line 353 via lines 357-1, 357-2, and 357-3. Lines 357, in at least one embodiment, can be sliding collar tow ropes. Sliding collar tow ropes can be used to control positioning of the lines 353 and 355 and positioning of sources 340, for instance, holding them in a desired position. As used herein, a sliding collar tow rope can include a rope with a cylinder, also known as a "sliding collar" that can slide up and down a line 353 when the sources 340 are hoisted or lowered by winches connected to lines 355. In at least one embodiment, a lead in can have a plurality of connection points 394 (also known as "take-outs"), and each connection point can be connected to a streamer. As a result, one lead-in can tow a plurality of streamers. Similarly, with respect to front floats, one lead-in can include a plurality of connection points for front floats such as the front float 332, and can facilitate towing a plurality of front floats.

In at least one embodiment, sources 340 can be hoisted up into front float 332 by winches or synchronized reels on the front float 332. In at least one embodiment, the sources can be hoisted in between hulls of a front float 332, for instance, when the front float 332 is a catamaran.

In at least one embodiment, the front float 332 can be towed from an end of a line 353 at the front of a streamer 306 (as illustrated in FIG. 3), or from a separate towing line, such as a lead-in or a cable that can house power and communication lines. In such an example, a cable can include an umbilical line for towing within a marine survey system and can include the use of a wire rope as a tow line and a bundle of individual air hose lines and electrical cables bundled together.

In at least one embodiment, marine survey system 300 can include a source sled 350. While a source sled is illustrated in FIG. 3, examples are not limited to a source sled configuration. Other source configurations can be used including impulsive and non-impulsive source configurations. While one source sled 350 is illustrated in FIG. 3, marine survey system 300 can include more or less source sleds 350. A lead-in 326 associated with streamer 306 can include a connection point 394 where the source sled 350 can be suspended from a line, such as a cable housing power and communication lines. For example, source sled 350 may use a fluid, such as air, for pressure compensation, which can be transferred through line 325 or a lead-in 326 from the marine survey vessel, which can be an umbilical. The connection point 394 can be a point of connection between a lead-in 326 going to a marine survey vessel and the streamer 306.

In at least one embodiment, the front float 332 can be connected to a line or cable upstream, for instance at the connection point 396. For example, in at least one embodiment, the cable 392 is a jumper cable. As used herein, a jumper cable can be used to connect seismic instruments or interconnect seismic cables. While one cable 392 is illustrated in FIG. 3, the marine survey system 300 can include more or fewer cables. In at least one embodiment, the front float 332 can be connected to a line downstream. For instance, the connection point 394 can be a point where the line 353 is connected to a lead-in 326 for load transfer, while electrical energy and communication can be connected at a secondary connection point 396. Connection points 394 and 396 can be co-located in at least one embodiment with the connection point 394 where a front of the streamer 306 is connected to a lead-in 326.

Figure 4:
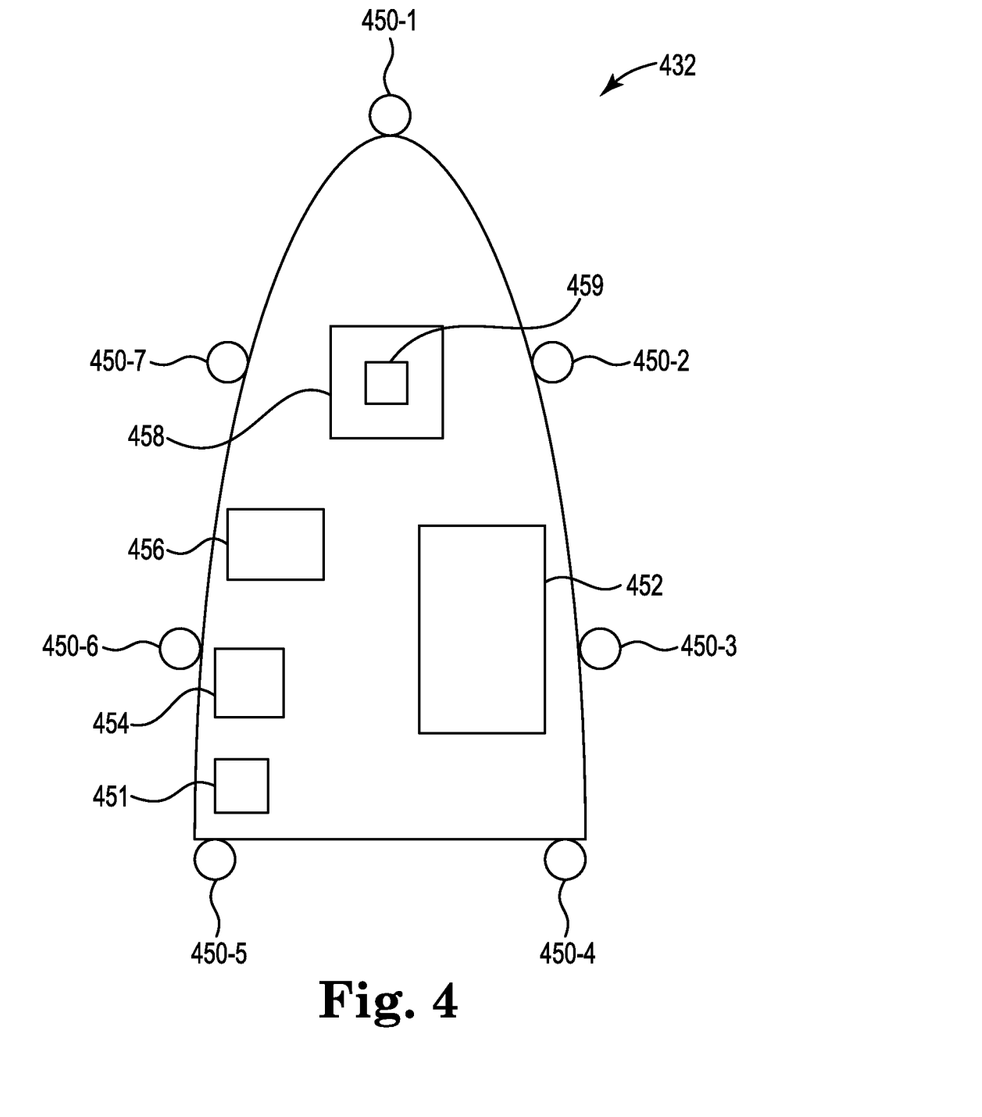
FIG. 4 illustrates a top view of a front float.

FIG. 4 illustrates a top view of a front float 432. While the front float 432 as illustrated in FIG. 4 includes a plurality of components, some or all of the components illustrated in FIG. 4 may not be present on the front float 432. Additionally, positioning and scale of the components on front float 432 can vary from the positioning and scale shown in FIG. 4.

The front float 432 can include a winch 454 configured to adjust a position of at least one of a plurality of sources. For instance, the winch 454 can control a depth of at least one of the plurality of sources. The winch 454 can extend lines or cables between the front float 432 and at least one of the plurality of sources, as discussed with respect to FIG. 3. In at least one embodiment, the winch 454 is located onboard the front float 432. In another embodiment, the winch 454 can be coupled to the front float 432 externally to the front float 432. While one winch is illustrated in FIG. 4, more winches may be onboard and coupled to front float 432.

In at least one embodiment of the present disclosure, the front float 433 can include the winch 454 coupled to a source via a line or cable. The winch 454 can extend and retract the line or cable to lower and raise the source between the float and the seafloor. For example, the winch 454 can retract the line or cable to raise a source coupled to the line or cable closer to the surface of the water or the winch can extend the line or cable to be extended and lower the source further from the surface of the water and closer to the seafloor.

The front float 432 can also include a control unit 459 configured to control and monitor functions associated with the front float 432. The control unit 459 may be part of onboard equipment 458, which can include navigation, source control, and data recording equipment, among others. In at least one embodiment, the control until 459 can be operated remotely. In at least one embodiment, the control unit 459 can be operated automatically. Operating automatically can mean, for example, actuating a system in response to a predetermined condition or sequence, without requiring further input from a remote location or human operator. For instance, the control unit 459 can monitor and keep track of all activities associated with functions of the front float 432 and components and activities associated with the front float 432. Functions can include, for instance, operations of the front float 432 or its components including operations of a control and communication unit, winch, bay door, global positioning system (GPS), acoustic pinger, router, an alternative energy source, navigation lights, or a compressor, among others. The control unit 459 can be located on the float, but in at least one embodiment can be remotely overridden. For instance, some activities and systems can be automatically controlled while others may be remotely controlled. An example automatic operation or function can include a GPS indicating a position of the front float 432 independently, near-continuously, or without user input. Another example automatic operation can include navigation lights turning on independently, near-continuously, or without user input. In some examples, an automatic operation or function can occur independently or without user input and in response to a predetermined condition or sequence. For instance, navigational lights may operate automatically such that they illuminate in response to particular light levels. While these example automatic functions are described, other functions associated with the front float 432 or its components may operate automatically.

The front float 432 can also include a communication unit configured to facilitate remote operation of the front float 432. Remote operation can include operating the front float 432 from a location away from the front float 432, for example from a marine survey vessel or an office setting, among others. The communication unit, in at least one embodiment, can be housed with the onboard equipment 458 and may be part of the control unit 459. The communication unit can be a part of a computer unit, radio system unit, and/or a telemetry unit. For instance, the communication unit can accommodate a precision time protocol that can be used to facilitate timing of source actuation. For instance, because there may be a feedback loop to the sources timing of source actuation may be desired.

In at least one embodiment of the present disclosure, the control unit 459 can be configured to control active heave compensation of a plurality of sources. As used herein, Active heave compensation is a used to lift or lower components to reduce the influence of waves upon offshore operations. Active heave compensation differs from passive heave compensation by having a unit that actively tries to compensate for any movement at a specific point, using power to gain accuracy. For instance, it may be desired to have one or more sources at particular depths. Based on a sea state such as wave, the front float 432 may move up and down. The control unit 459 can implement active heave compensation to keep the one or more sources at the particular depth. The control unit 459 can communicate with one or more winches 454 coupled to the front float 432 to keep the source at the desired particular depth. The active heave compensation may be performed automatically, such that no user input is used to adjust the source positions.

For instance, in at least one embodiment, the winch 454 can include an electronic controller. The electronic controller can control the operation of the winch 454, such as extending or retracting a line or cable. The electronic controller can be programmed with the first position of one of the plurality of sources or first length of an associated line or cable such that the winch 454 will not extend the line or cable too far. The electronic controller can be programmed with a second position of at least one of the sources or second length of the line or cable such that the winch 454 will not retract the line or cable too far. In at least one embodiment, the electronic controller or at least a portion of the functionality of the electronic controller can be provided by the control unit 459 and with onboard equipment of the marine survey vessel (e.g., control unit 101 associated with the onboard equipment 104 of the marine survey vessel 102 illustrated in FIG. 1). In at least one embodiment, the winch 454 can include a sensor configured to detect the position of at least one of the plurality of sources or a length of an associated line or cable that is extended. Information from the sensor can be passed to the control unit 459 and the control unit associated with the onboard equipment of the marine survey vessel. The winch 454 can include or be coupled to a transceiver for wireless communication with the control unit 459 and the control unit associated with the onboard equipment of the marine survey vessel. Such communication between the winch 454, the front float 432, and the marine survey vessel can be provided in a wired fashion in at least one embodiment.

The front float 432 can also include a GPS 456 configured to position the front float 432. In at least one embodiment, the GPS 456 may be integrated with onboard equipment 458. For instance, locations of the front float 432 can be determined using the GPS 456 and adjusted, if desired. In at least one embodiment, the front float 432 can include an acoustic pinger (not illustrated in FIG. 4). As used herein, an acoustic pinger is a device that transmits short high-pitched signals at brief intervals for purposes of detection, measurement, or identification. For instance, a spread of a marine survey system can include an acoustic network. In at least one embodiment, in order to connect front float 432 to the acoustic network, an acoustic pinger is in communication with the GPS 456 (or a GPS on the marine survey vessel) because the GPS 456 may or may not work underwater.

The front float 432 can further include a backup power source 452 to provide power to front float 432 in response to loss of power, such as due to a malfunction in at least one of the lines or cables coupled to the front float 432. For instance, the backup power source 452 can include a battery, a solar panel, and a turbine, among others. For example, the front float 432 may be provided power from a marine survey vessel via a lead-in such as lead-in 326 illustrated in FIG. 3 and a tether cable, such as cable 353 illustrated in FIG. 3 which can house power and communication lines. However, if any of the aforementioned cables suffers a malfunction, such a glitch or loss of power, the backup power source 452 can take over power-providing duties. This can keep the control unit 459 functioning, for instance, even during a loss of primary power. In at least one embodiment, the front float 432 can be provided power both from a backup power source 452 and via a power line. For instance, the backup power source 452 can power certain components of the front float 432, while power received via a power line is used to power other components of the front float 432.

Navigational lights 450-1, . . . , 450-7 may be included on the front float 432 to provide positional information of the front float 432 in at least one embodiment. Navigational lights, as used herein, can include a colored source of illumination on a waterborne object used to signal position, heading, and status. Navigational lights 450 can help determine a position and location of the front float 432, for example. This positional information, including location or orientation, among others, may be useful in determining positions of other components of a marine survey system, such as sources coupled to the front float 432. Navigational lights 450 may be onboard front float 432 and coupled externally to the front float 432.

The front float 432 can also include a compressor 451 configured to supply sources coupled to the front float 432 with compressed air. For instance, because the sources or portions of the sources can be flexible and may need to be pressurized internally to prevent collapsing while sinking, (e.g., pressure compensation) the compressor 451 can distribute compressed air or other gas via a line, such as an umbilical, to the sources or a pressurized storage tank.

Figure 5:
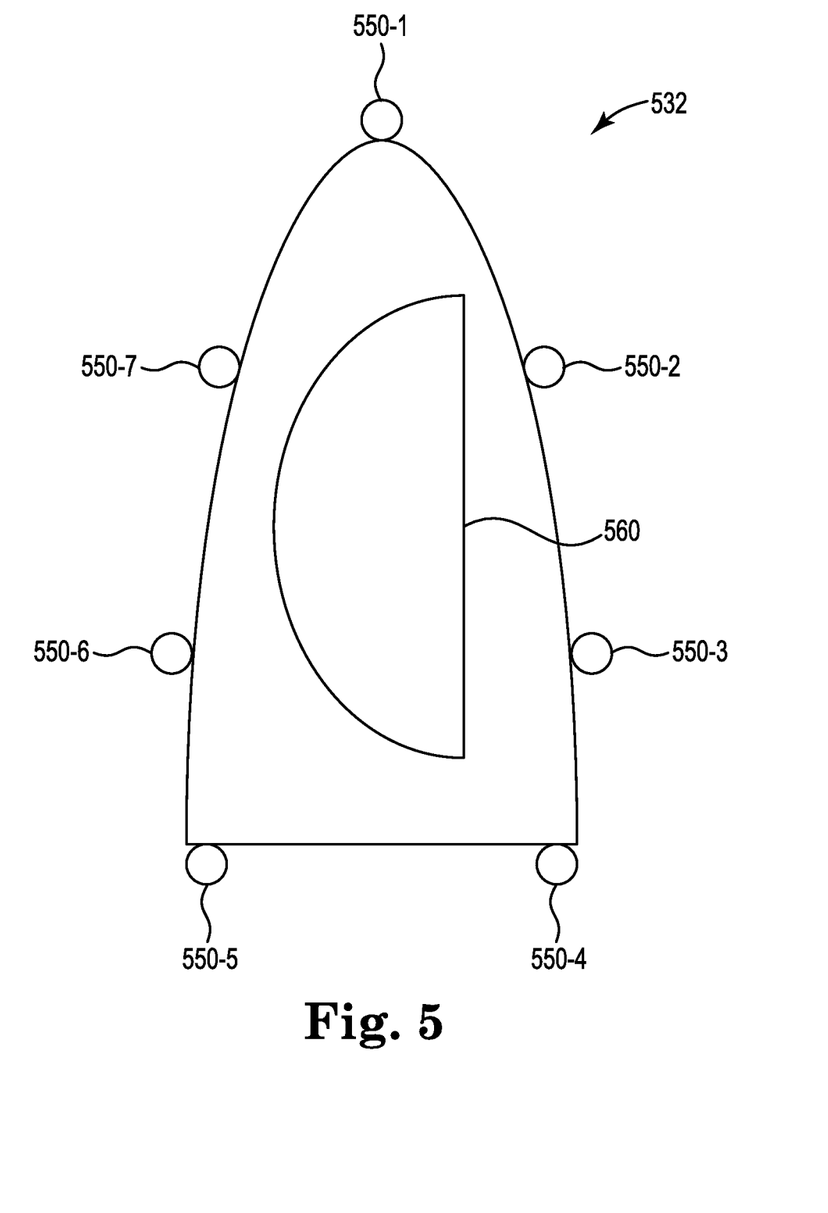
FIG. 5 illustrates a bottom view of a front float.

FIG. 5 illustrates a bottom view of a front float 532. While the front float 532 as illustrated in FIG. 5 includes a plurality of components, some or all of the components illustrated in FIG. 5 may not be present on the front float 532. Additionally, positioning and scale of the components on the front float 532 can vary from the positioning shown in FIG. 5. The front float 532 can be analogous to the front float 432 illustrated in FIG. 4.

The front float 532 can include navigational lights 550-1, . . . , 550-7 configured to provide positional information of front float 532. These navigational lights 550 can be analogous to navigational lights 450 illustrated in FIG. 4. More or fewer navigational lights 550 than illustrated in FIG. 5 may be present on front float 532. Navigational lights 550 can be onboard front float 532 or coupled externally to front float 532.

The front float 532 can also include a bay door 560 configured to open and close electronically, mechanically, hydraulically, in response to an electronic, mechanical, or hydraulic actuation, etc. and accommodate storage of at least one of a plurality of sources coupled to the front float 532. For instance, a source can be stored within a bay protected by the bay door 560. The source can be released from the bay by electronically opening the bay door 560 and releasing the source. This release can be controlled by a control unit located on the front float 532 (e.g., the control unit 459 described with respect to FIG. 4).

The front float 532 can also include barnacle repellant (not illustrated in FIG. 5) to reduce barnacles growing on front float 532. Barnacles can attach themselves to synthetic structures, such as front float 532, sometimes to the structure's detriment. Barnacle repellant or other repelling techniques can be used to reduce barnacle attachment to the front float 532.

Figure 6:
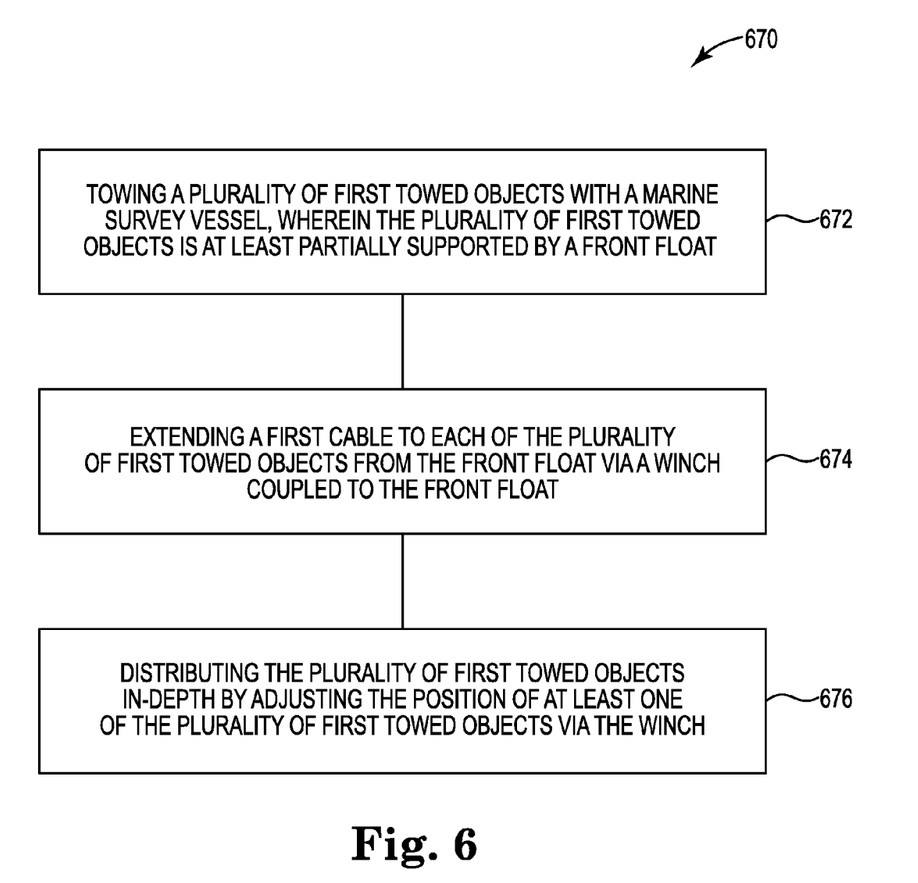
FIG. 6 illustrates a method flow diagram.

FIG. 6 illustrates a method flow diagram 670. At 672, a method can include towing a plurality of first towed objects with a marine survey vessel, wherein the plurality of first towed objects is at least partially supported by a front float. The plurality of first towed objects can include sources, and the sources may be coupled to the front float via cables such as umbilicals or tether cables, for example. In at least one embodiment, a second towed object can be towed with the marine survey vessel and can be at least partially supported by the front float. The second towed object can include a streamer, for instance, and can be coupled to the marine survey vessel via the same lead-in as the front float.

At 674, the method can include extending a first cable to each of the plurality of first towed objects from the front float via a winch coupled to the front float. The first cable can include the umbilical or tether cable and can accommodate the transfer of electrical energy between the front float and the first towed objects, as well as communication and air or gas. In at least one embodiment, the method further includes extending a second cable to the second towed object from the front float. The second cable can include the aforementioned umbilical or tether cable and can accommodate the transfer of electrical energy between the front float and the second towed object, as well as communication and air or gas. For instance, in at least one embodiment, the first towed object can be a source, such as a bender source. These sources may use cables configured to transfer electrical energy, communication, and air to compensate for ambient water pressure. As such, the cable going to the source can be an umbilical-type communication line, including a power line, communication line, and in some instances, an air hose.

At 676, the method can include distributing the plurality of first towed objects in-depth by adjusting the position of at least one of the plurality of first towed objects via the winch. For instance, the front float can have one or more onboard winches to extend lines between the front float and the plurality of first towed objects and the front float and the second towed object. To adjust the in-depth position of the plurality of first towed objects, the lines or cables can be extended outward from and retracted inward toward the front float by way of a winch coupled to the front float. In at least one embodiment, the winch can be housed onboard and within the front float and coupled externally to the front float. The plurality of first towed objects can be adjusted in-depth by rotating the winch and extending and retracting the lines. Additionally or alternatively, sliding collar tow ropes can be used to adjust the plurality of first towed objects in-depth.

In at least one embodiment, the method can include controlling the distributing of the plurality of first towed objects via a control unit located on the front float. For instance, a winch can include an electronic controller that can control the operation of the winch, such as extending or retracting a line. The electronic controller can be in communication with the control unit on the front float, and the control unit can control the distribution of the plurality of first towed objects. This control can be performed remotely or automatically, for example.

Figures 7, 8:
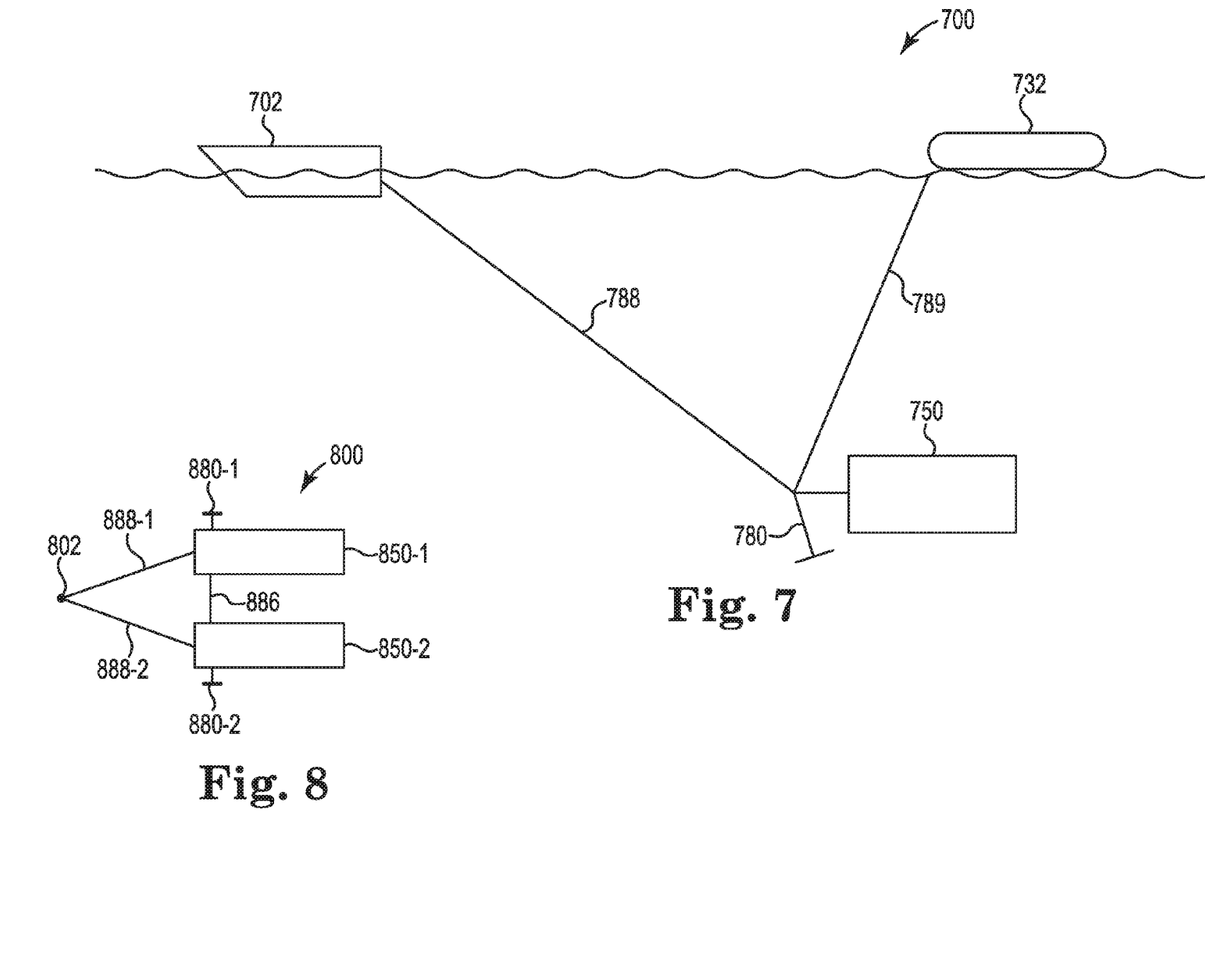
FIG. 7 illustrates a side view of a marine survey system including a front float, a source sled, and a depressor.
FIG. 8 illustrates a top view of the marine survey system including source sleds.

FIG. 7 illustrates a side view of a marine survey system 700 including a front float 732, a source sled 750, and a depressor 780. While only one source sled and one depressor are illustrated in FIG. 7, more source sleds and depressors may be included in marine survey system 700. Also, while a source sled is illustrated, other source configurations may be utilized. As used herein, a depressor can include a system component configured to weigh down another system component, for example, a depressor can include a weight or a hydrofoil system. Marine survey vessel 702 can tow the source sled 750 via a cable 788. Cable 788 can house power and communication lines to transfer electrical energy and provide digital communication between source sled 750 and marine survey vessel 702 and in at least one embodiment can provide air to source sled 750 (e.g., via an umbilical). In at least one embodiment, the depressor 780 pulls down source sled 750, and the front float 732 prevents the source sled 750 from being pulled below a threshold depth. In at least one embodiment, the threshold depth is determined by lengths of cable 788 or lines such as the line 789 connected to cable 788 and going to the front float 732. In at least one embodiment, the threshold depth is determined by these cable lengths, weights, a force of the depressor 780, and drag on components of the marine survey system 700.

FIG. 8 illustrates a top view of the marine survey system 800 including source sleds 850-1 and 850-2. In at least one embodiment, marine survey system 800 can be marine survey system 700 illustrated in FIG. 7. Similarly, while source sleds 850 are illustrated, other source configurations may be used. Source sleds 850-1 and 850-2 can be connected by line 886 which can be a passive tow member. The source sleds 850-1 and 850-2 can be connected to marine survey vessel 802 via cables 888-1 and 888-2, respectively, which can house power and communication lines to transfer electrical energy, communication, and in at least one embodiment, air, between each individual source sled and marine survey vessel 802. For instance, cables 888-1 and 888-2 can include a tether cable. A hydrofoil 880-1 can pull out laterally the source sled 850-1, while hydrofoil 880-2 can pull out laterally the source sled 850-2 to separate the source sleds 850-1 and 850-2. While two source sleds and two hydrofoils are illustrated in FIG. 8, more or fewer source sleds and depressors may be present in marine survey system 800.

Figure 9:
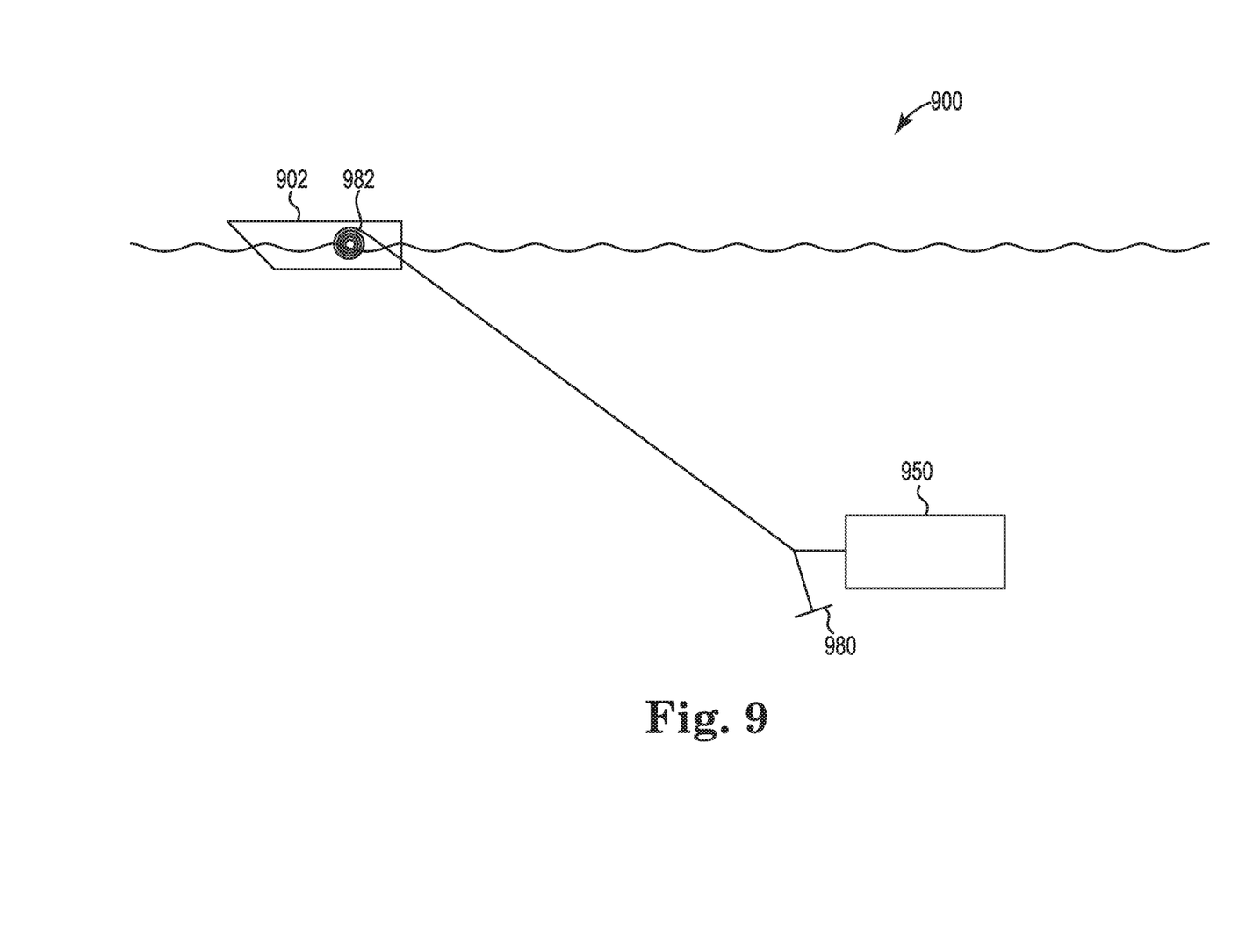
FIG. 9 illustrates a side view of a marine survey system including a source sled and a depressor.

FIG. 9 illustrates a side view of a marine survey system 900 including a source sled 950 and a depressor 980. In at least one embodiment, the depressor 980 pulls down with a greater force as compared to depressor 780 as referenced in FIG. 7. In at least one embodiment, layback can be shorter as compared to depressor 780. As used herein, layback can include a distance the source sled 950 is behind the marine survey vessel 902. An active heave compensation winch 982 on the marine survey vessel 902 can deploy source sled 950-1 to a desired depth in at least one embodiment, and an accelerometer and control system on the marine survey vessel 902 can be used to actively compensate for vertical marine survey vessel movements by adjusting the active heave compensation winch 982. In at least one embodiment, the control system can compensate for changes in speed and currents when the source sled 950-1 is at a desired depth. While a source sled 950 is illustrated in FIG. 9, other source configurations may be used.

Figure 10:
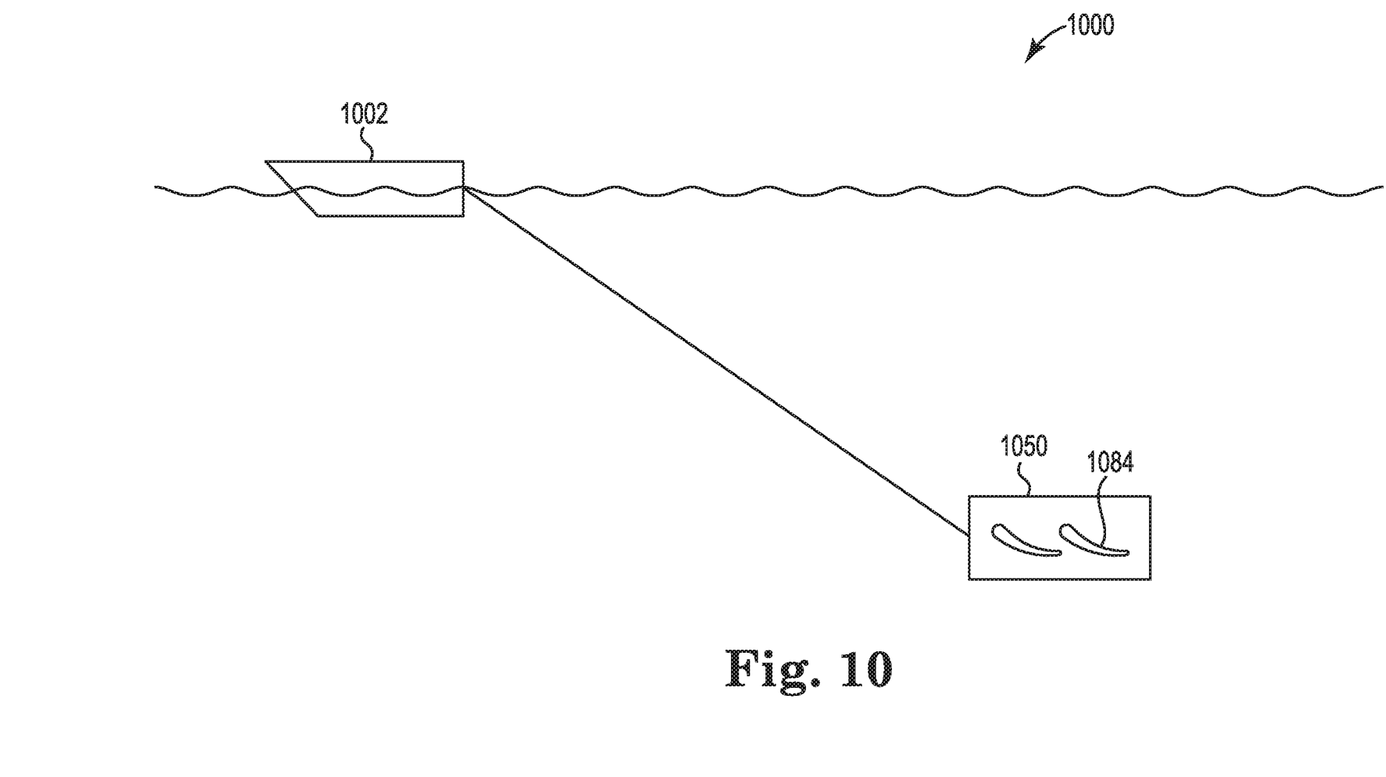
FIG. 10 illustrates a side view of a marine survey system including a source sled and an active foil depressor system located on the source sled

FIG. 10 illustrates a side view of a marine survey system 1000 including a source sled 1050 and an active foil depressor system 1084 located on the source sled 1050. In at least one embodiment, active foils within the active foil depressor system 1084 can be used to pull the source sled 1050 down. A winch located on vessel marine survey 1002 can deploy the source sled 1050 with enough layback such that the active foils can pull down the source sled 1050 to a desired depth or desired depth range. The layback may be greater, for example, than the example illustrated in FIG. 9. In at least one embodiment, at the desired depth or desired depth range, the active foils can compensate for speed and current changes, among other factors. While a source sled 1050 is illustrated in FIG. 9, other source configurations may be used.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A system, comprising;
   a source;
   a front float coupled to the source, the front float comprising:
      a winch configured to adjust a position of the source; and
      a control unit configured to control functions associated with the front float; and
   a plurality of cables coupled to the front float and at least one of the plurality of cables couple to the source and configured to accommodate transfer of electrical energy between the front float and the source.

2. The system of claim 1, wherein the front float further comprises a bay door configured to open and close in response to a control signal and accommodate storage of the source.

3. The system of claim 1, wherein the front float further includes a global positioning system (GPS) configured to indicate a position of the front float.

4. The system of claim 1, wherein the front float further includes a backup power source configured to provide power to the front float in response to a loss of power from the at least one of the plurality of cables.

5. The system of claim 1, wherein the front float further includes a battery configured to provide power to at least a portion of the functions associated with the front float.

6. The system of claim 1, wherein the front float further includes a solar panel configured to provide power to at least a portion of the functions associated with the front float.

7. The system of claim 1, wherein the front float further includes a turbine configured to provide power to a portion of the functions associated with the front float.

8. The system of claim 1, wherein the front float further includes navigational lights configured to provide front float positional information.

9. The system of claim 1, wherein the front float further includes a compressor configured to supply the source with compressed air.

10. The system of claim 1, wherein the control unit is operated remotely.

11. The system of claim 1, wherein the control unit is operated automatically.

12. The system of claim 1, wherein the control unit is configured to control active heave compensation of the source.

13. A method, comprising:
towing a plurality of first towed objects with a marine survey vessel, wherein the plurality of first towed objects is at least partially supported by a front float;
extending at least one first cable of a plurality of first cables to each of the plurality of first towed objects from the front float via at least one winch coupled to the front float,
wherein each of the first cables is configured to accommodate transfer of electrical energy between the front float and a respective first towed object of the plurality of first towed objects; and
distributing the plurality of first towed objects in-depth by adjusting the position of at least one of the plurality of first towed objects via the at least one winch.

14. The method of claim 13, wherein the method further includes towing a second towed object with the marine survey vessel, wherein the second towed object is at least partially supported by the front float.

15. The method of claim 14, wherein the method further includes extending a second cable to the second towed object from the front float via a connection point.

16. The method of claim 13, wherein the method further includes controlling the distributing of the plurality of first towed objects via a control unit located on the front float.

17. A system, comprising:
a marine survey vessel;
a plurality of streamers coupled to the marine survey vessel;
a plurality of front floats coupled to the plurality of streamers and configured to distribute a plurality of sources cross-line and in-depth; and
a plurality of cables coupled to at least one of the plurality of front floats and at least one of the plurality of cables couple to a respective source of the plurality of sources and configured to accommodate transfer of electrical energy between the at least one front float and the respective source.

18. The system of claim 17, wherein at least one of the plurality of front floats includes a compressor configured to distribute compressed air via an umbilical to at least one of the plurality of sources.

19. The system of claim 17, wherein at least one of the plurality of front floats includes a winch configured to control a depth of at least one of the plurality of sources.

20. The system of claim 17, wherein at least one of the plurality of front floats includes a control unit configured to control and monitor functions on at least one of the plurality of front floats.

21. The system of claim 17, wherein at least one of the plurality of front floats includes a communication unit configured to facilitate remote operation of at least one of the plurality of front floats.

22. The system of claim 17, wherein each the plurality of sources is a non-impulsive source.

* * * * *